US010279675B2

(12) United States Patent
Kuroda et al.

(10) Patent No.: US 10,279,675 B2
(45) Date of Patent: May 7, 2019

(54) IN-WHEEL MOTOR DRIVE DEVICE

(71) Applicant: NTN CORPORATION, Osaka (JP)

(72) Inventors: Masaru Kuroda, Shizuoka (JP); Tomohisa Uozumi, Shizuoka (JP); Kenichi Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 99 days.

(21) Appl. No.: 15/102,334

(22) PCT Filed: Nov. 18, 2014

(86) PCT No.: PCT/JP2014/080489
§ 371 (c)(1),
(2) Date: Jun. 7, 2016

(87) PCT Pub. No.: WO2015/093215
PCT Pub. Date: Jun. 25, 2015

(65) Prior Publication Data
US 2016/0355083 A1    Dec. 8, 2016

(30) Foreign Application Priority Data

Dec. 17, 2013   (JP) ................................. 2013-260181

(51) Int. Cl.
*B60K 7/00* (2006.01)
*F16C 35/063* (2006.01)
(Continued)

(52) U.S. Cl.
CPC .............. *B60K 7/0007* (2013.01); *B60K 7/00* (2013.01); *B60K 17/046* (2013.01); *F16C 19/06* (2013.01);
(Continued)

(58) Field of Classification Search
CPC .................................. B60K 7/00; B60K 17/14
See application file for complete search history.

(56) References Cited

U.S. PATENT DOCUMENTS 6,383,112 B1 * 5/2002 Itoh ........................ F16H 15/38
476/40
2001/0025521 A1 * 10/2001 Kanamaru ............. B21K 1/063
72/356
(Continued)

FOREIGN PATENT DOCUMENTS

CN        1392934        1/2003
CN      103328247        9/2013
(Continued)

OTHER PUBLICATIONS

International Preliminary Report on Patentability and Written Opinion of the International Searching Authority dated Jun. 21, 2016 in corresponding International Application No. PCT/JP2014/080489.
(Continued)

*Primary Examiner* — Terrance L Kenerly
(74) *Attorney, Agent, or Firm* — Wenderoth, Lind & Ponack, L.L.P.

(57) ABSTRACT

An in-wheel motor drive device includes: a motor part; a speed reduction part; a wheel bearing part; and a casing, the motor part including: a stator, which is fixed to the casing; a rotation shaft of a motor, which is rotatably supported on the casing through intermediation of a plurality of rolling bearings; and a rotor, which is mounted to the rotation shaft of the motor, the rotation shaft of the motor being configured to rotationally drive an input shaft of a speed reducer, the speed reduction part being configured to reduce a speed of rotation of the input shaft of the speed reducer to transmit the rotation to an output shaft of the speed reducer, the wheel bearing part being connected to the output shaft of the speed reducer, the rotation shaft of the motor being made of case hardening steel and subjected to carburizing, quenching, and tempering.

4 Claims, 6 Drawing Sheets

(51) Int. Cl.
| | |
|---|---|
| *F16C 19/06* | (2006.01) |
| *H02K 1/22* | (2006.01) |
| *H02K 1/28* | (2006.01) |
| *H02K 7/00* | (2006.01) |
| *H02K 7/116* | (2006.01) |
| *H02K 15/00* | (2006.01) |
| *H02K 15/14* | (2006.01) |
| *F16C 19/18* | (2006.01) |
| *B60K 17/04* | (2006.01) |
| *F16H 1/32* | (2006.01) |
| *H02K 7/08* | (2006.01) |
| *B60K 11/02* | (2006.01) |
| *B60K 1/00* | (2006.01) |

(52) U.S. Cl.
CPC .......... *F16C 19/186* (2013.01); *F16C 35/063* (2013.01); *F16H 1/32* (2013.01); *H02K 1/22* (2013.01); *H02K 1/28* (2013.01); *H02K 7/003* (2013.01); *H02K 7/08* (2013.01); *H02K 7/116* (2013.01); *H02K 15/00* (2013.01); *H02K 15/14* (2013.01); *B60K 11/02* (2013.01); *B60K 2001/006* (2013.01); *B60K 2007/0038* (2013.01); *B60K 2007/0092* (2013.01); *B60L 2220/44* (2013.01); *B60Y 2306/03* (2013.01); *F16C 2326/02* (2013.01); *Y02T 10/641* (2013.01)

(56) References Cited

U.S. PATENT DOCUMENTS

| | | | |
|---|---|---|---|
| 2004/0099498 | A1 | 5/2004 | Kurita et al. |
| 2010/0001606 | A1* | 1/2010 | Ogami ................. H02K 1/2766 |
| | | | 310/156.53 |
| 2012/0219438 | A1* | 8/2012 | Chung .................... H02K 7/04 |
| | | | 417/423.7 |
| 2013/0292993 | A1 | 11/2013 | Yukishima et al. |

FOREIGN PATENT DOCUMENTS

| | | | | |
|---|---|---|---|---|
| JP | 10-290554 | | 10/1998 | |
| JP | 2001-11535 | | 1/2001 | |
| JP | 2002-54658 | | 2/2002 | |
| JP | 2002-276680 | | 9/2002 | |
| JP | 2007-113611 | | 5/2007 | |
| JP | 2008286315 | * | 11/2008 | ................ F16C 3/02 |
| JP | 2011-122679 | | 6/2011 | |
| JP | 2012-39765 | | 2/2012 | |
| JP | 2012-66602 | | 4/2012 | |
| JP | 2012-148725 | | 8/2012 | |

OTHER PUBLICATIONS

International Search Report dated Feb. 10, 2015 in International (PCT) Application No. PCT/JP2014/080489.
Chinese Office Action dated Mar. 14, 2018 in corresponding Chinese Patent Application No. 201480068424.X with English translation of Search Report.

* cited by examiner

IN-WHEEL MOTOR DRIVE DEVICE

TECHNICAL FIELD

The present invention relates to an in-wheel motor drive device.

BACKGROUND ART

The related-art in-wheel motor drive device is described in, for example, JP 2012-148725 A (Patent Document 1). The in-wheel motor drive device described in JP 2012-148725 A includes a motor part configured to generate driving force, a wheel bearing part to be connected to a wheel, and a speed reduction part arranged between the motor part and the wheel bearing part and configured to reduce a speed of rotation of the motor part to transmit the rotation to the wheel bearing part.

In the above-mentioned in-wheel motor drive device, a low-torque high-rotation motor is utilized in the motor part from the viewpoint of device compactness. Meanwhile, the wheel bearing part requires a large torque for driving the wheel. Therefore, a cycloid reducer capable of obtaining a high speed reduction ratio with a compact size is utilized.

The motor part is a radial gap motor including a stator fixed to a casing, a rotor arranged inside the stator at an opposed position with a radial gap, and a rotation shaft of the motor, which is connected and fixed to the inside of the rotor to rotate integrally with the rotor. Both axial ends of the rotation shaft of the motor having the hollow structure are rotatably supported on the casing by a pair of rolling bearings.

The speed reduction part in which the cycloid reducer is utilized mainly includes an input shaft of the speed reducer having a pair of eccentric parts, a pair of curved plates arranged at the eccentric parts, respectively, a plurality of outer periphery engagement members configured to engage with outer peripheral surfaces of the curved plates to cause rotational motion of the curved plates, and a plurality of inner pins configured to transmit the rotational motion of the curved plates to an output shaft of the speed reducer. The above-mentioned rotation shaft of the motor is spline-connected to the input shaft of the speed reducer.

PRIOR ART DOCUMENTS

Patent Documents

Patent Document 1: JP 2012-148725 A

SUMMARY OF THE INVENTION

Problems to be Solved by the Invention

Incidentally, the in-wheel motor drive device is accommodated inside a wheel housing to increase the unsprung weight. Therefore, downsizing and light-weighting are essential to the in-wheel motor drive device. However, the output torque of the motor is proportional to the size of the motor, and hence a large-sized motor is required to generate a torque necessary for driving the vehicle with the motor alone. As a result, the weight is increased. In view of this, a speed reducer is combined with the motor, thereby being capable of downsizing the motor. When the speed reduction ratio is increased to achieve a small-sized motor, the rotation speed needs to be increased inevitably. For example, the use of a speed reducer having a speed reduction ratio of 11 requires a high rotation speed of about 15,000 $min^{-1}$.

The in-wheel motor drive device is mounted under a spring of the vehicle, and hence vibrations of the in-wheel motor drive device significantly affect the ride comfort of the vehicle. Further, the in-wheel motor drive device is shifted from zero-speed to a high-speed range, thereby causing vibrations and interior noises within an audible range at a point at which resonance on the periphery of a suspension device and a forced vibration component cross each other. As a result, passengers may have a feeling of discomfort. Thus, reduction of a rotational first-order forced vibration component, which leads to all kinds of vibrations, may significantly contribute to quietness of the vehicle.

The in-wheel motor drive device described in Patent Document 1 has room for improvement to address the above-mentioned problem.

The present invention has been proposed in view of the above-mentioned problem, and has an object to provide an in-wheel motor drive device that is reduced in size and weight, excellent in quietness, and is enhanced in durability.

Solutions to the Problems

The present invention is based on the following findings obtained through investigations to achieve the above-mentioned object, which have been conducted from various viewpoints for a rotation shaft of a motor having a rotor mounted thereto in an in-wheel motor drive device.

(1) Processability

Adjustment of the amount of unbalance in the rotation shaft of the motor having the rotor mounted thereto, which is a high-speed spindle, is essential to suppress vibrations, and the easiness of adjustment in mass production apparatus for automobiles affects the cost. Specifically, as a method of adjusting unbalance, there are given a method of adjusting unbalance by adding a weight, and a method of adjusting unbalance by cutting a part of the spindle. The addition of a weight to a high-speed rotary member may result in detachment of the weight during rotation, and hence the method of adjusting unbalance by cutting is selected in general.

The adjustment of unbalance is performed when the assembling is completed to obtain the rotation shaft of the motor having the rotor mounted thereto, and hence the cutting work is performed after heat treatment. When the hardness of the surface to be processed for the adjustment of unbalance is high, the surface is difficult to cut, resulting in low processability. Due to the low processability, the cycle time of the cutting step becomes longer, thus leading to cost increase. On the other hand, when the hardness of the surface to be processed for the adjustment of unbalance is low and close to the hardness of a raw material, the surface is easy to cut, resulting in satisfactory processability. Due to the satisfactory processability, the cycle time of the cutting step becomes shorter, thus leading to cost reduction. Low-carbon steel is desired as a steel grade in which satisfactory processability is secured as a raw material.

Heat treatment is performed for the high-speed spindle in order to enhance the abrasion resistance at the fitting portion. Through the heat treatment, the surface hardness is increased. Thus, it has been found desirable to satisfy both conflicting demands for enhancing the processability and the easiness of heat treatment.

(2) Abrasion Resistance

The rotation shaft of the motor having the rotor mounted thereto includes the rotation shaft of the motor, which is supported by rolling bearings at both ends of the rotation shaft of the motor, and the rotor, which is formed of magnets and silicon steel plates. It is preferred that the rotation shaft of the motor and the rotor be fitted to each other by interference fit or shrink fit with an interference selected in consideration of expansion caused by centrifugal force and thermal expansion. In the case of interference fit, a radially outer portion of the rotation shaft of the motor and a radially inner portion of the rotor are press-fitted in contact with each other at the time of assembling. Therefore, the radially outer portion of the rotation shaft of the motor is required to have high surface hardness for the purpose of enhancing the abrasion resistance at the contact portion.

For the rolling bearings configured to support the rotation shaft of the motor, it is desired that inner rings of the bearings and the rotation shaft of the motor be fitted to each other by interference fit from the viewpoint of suppressing vibrations. The fitting portion of the rotation shaft of the motor is required to have high surface hardness in order to prevent the bearings from damaging the fitting portion of the rotation shaft of the motor at the time of assembling.

Further, the compactness of the in-wheel motor drive device is achieved by connecting the motor part and the speed reduction part. A spline fitting portion serving as a torque transmitting portion between the motor part and the speed reduction part is required to have abrasion resistance and strength, and surface treatment or heat treatment is therefore essential. Thus, it has been found that easier heat treatment is preferred.

(3) Strength

The rotation shaft of the motor is also required to have toughness high enough to be durable against deformation during high-speed rotation. As a material capable of obtaining high surface hardness and toughness of the central portion, there are given case hardening steel to be subjected to carburizing and quenching, and medium carbon steel to be subjected to induction hardening. From the viewpoint of surface hardness, high-carbon chromium bearing steel may also be selected. However, in a case of through-hardening, it has been found that, in a shape having a large-diameter portion as in the case of the rotation shaft of the motor, quenching cracks may be generated during a rapid cooling step after heating due to a temperature gradient between the central portion and the surface portion.

(4) Cost

It is preferred that the material be easily available and inexpensive. As a material having high strength, high-carbon chromium bearing steel is given, but the cost is high. Besides, induction hardening using medium carbon steel is conceivable, but in this case, a dedicated heating coil needs to be manufactured, resulting in lack of flexibility in response to minor changes to the shape. In contrast, carburizing and quenching using case hardening steel are flexible in response to minor changes to the shape and also simple to discriminate the heat treatment portion and the non-heat treatment portion of the rotation shaft of the motor. Further, it has been found that case hardening steel is desired in terms of processability of the raw material and easiness of heat treatment.

As a technical measure to achieve the above-mentioned object, according to one embodiment of the present invention, there is provided an in-wheel motor drive device, comprising: a motor part; a speed reduction part; a wheel bearing part; and a casing, the motor part comprising: a stator, which is fixed to the casing; a rotation shaft of a motor, which is rotatably supported on the casing through intermediation of a plurality of rolling bearings; and a rotor, which is mounted to the rotation shaft of the motor, the rotation shaft of the motor in the motor part being configured to rotationally drive an input shaft of a speed reducer in the speed reduction part, the speed reduction part being configured to reduce a speed of rotation of the input shaft of the speed reducer to transmit the rotation to an output shaft of the speed reducer, the wheel bearing part being connected to the output shaft of the speed reducer, the rotation shaft of the motor being made of case hardening steel and subjected to carburizing, quenching, and tempering as heat treatment.

With the configuration described above, it is possible to achieve the in-wheel motor drive device comprising the rotation shaft of the motor, which has excellent processability and abrasion resistance at the fitting portion, has required surface hardness and toughness, facilitates the adjustment of unbalance, and has an advantage in terms of cost, so that the in-wheel motor drive device is reduced in size and weight, excellent in quietness, and is enhanced in durability.

It is desired that the above-mentioned rotation shaft of the motor comprise a flange portion to be brought into contact with one end of the rotor, that the motor part further comprise a clamping member to be brought into contact with another end of the rotor, that the rotor be clamped by the flange portion and the clamping member to be mounted to the rotation shaft of the motor, and that the flange portion comprise a low-hardness portion for adjustment of unbalance. In this case, the surfaces for correction of unbalance can be formed on the radially outer side, thereby being capable of reducing the cutting amount for the adjustment of unbalance, facilitating the adjustment of unbalance, and reducing the cost.

The above-mentioned low-hardness portion may be formed through anti-carburizing treatment. This process is flexible in response to minor changes to the shape of the rotation shaft of the motor and also simple to discriminate the heat treatment portion and the non-heat treatment portion, thereby being advantageous in terms of cost.

It is preferred that the rotation shaft of the motor having the above-mentioned rotor mounted thereto have a permissible residual specific unbalance of from 0.5 to 5 after the adjustment of unbalance. Thus, it is possible to suppress interior vibrations, achieve excellent quietness, and to prevent passengers' feelings of discomfort.

The above-mentioned clamping member may be made of a material different from a material for a rotary member. Thus, it is possible to select a material having high specific gravity, and also having non-magnetic property so that shavings to be generated by the cutting work for the adjustment of unbalance are not attracted to the rotor.

It is preferred that the above-mentioned clamping member be made of austenitic stainless steel. Thus, the material has non-magnetic property and high specific gravity, and is advantageous in terms of cost.

Effects of the Invention

According to the in-wheel motor drive device of the present invention, it is possible to achieve the in-wheel motor drive device that is reduced in size and weight, excellent in quietness, and is enhanced in durability.

EMBODIMENTS OF THE INVENTION

An in-wheel motor drive device according to an embodiment of the present invention is described with reference to FIG. 1 to FIG. 7.

Figure 6:
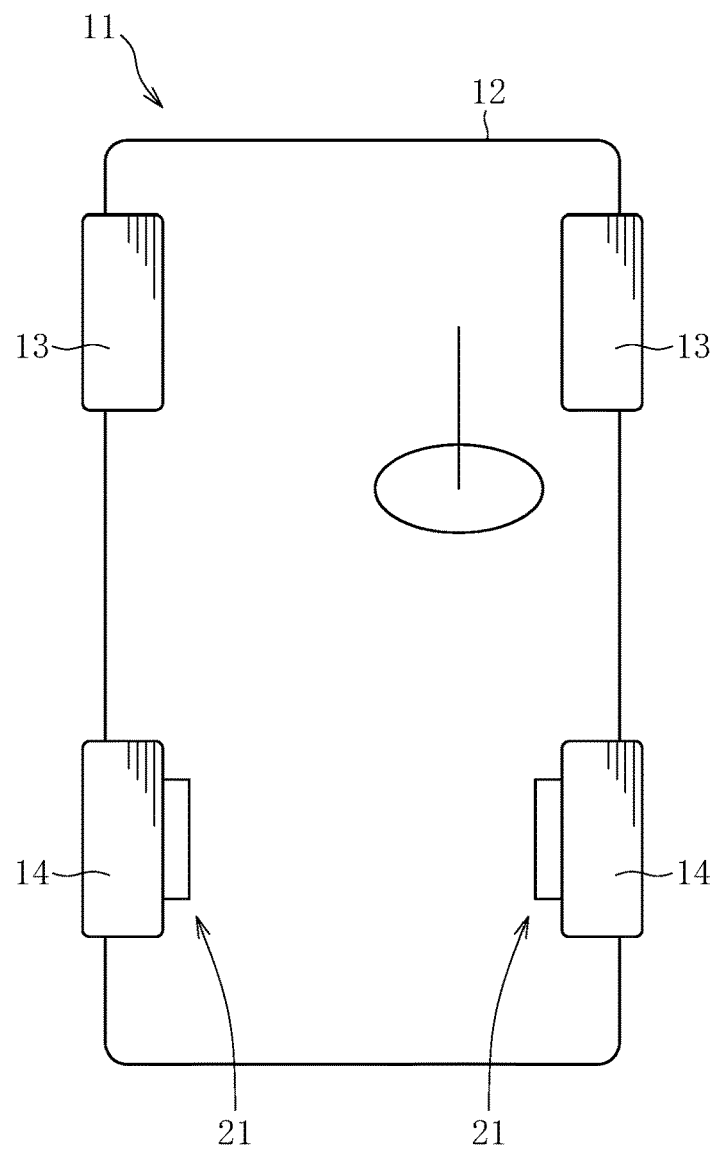
FIG. 6 is a plan view of an electric vehicle on which the in-wheel motor drive devices of FIG. 1 are mounted.
Figure 7:
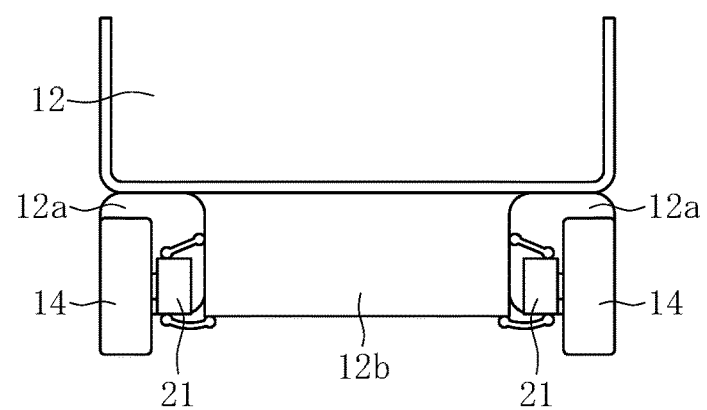
FIG. 7 is a rear sectional view of the electric vehicle of FIG. 6.

FIG. 6 is a schematic plan view of an electric vehicle 11 on which in-wheel motor drive devices 21 according to the embodiment of the present invention are mounted, and FIG. 7 is a schematic sectional view of the electric vehicle when viewed from behind. As illustrated in FIG. 6, the electric vehicle 11 comprises a chassis 12, front wheels 13 serving as steered wheels, rear wheels 14 serving as driving wheels, and the in-wheel motor drive devices 21 configured to transmit driving force to the right and left rear wheels 14, respectively. As illustrated in FIG. 7, each rear wheel 14 is accommodated inside a wheel housing 12a of the chassis 12 and fixed below the chassis 12 through intermediation of a suspension device (suspension) 12b.

In the suspension device 12b, a horizontally extending suspension arm supports the rear wheels 14, and a strut comprising a coil spring and a shock absorber absorbs vibrations that each rear wheel 14 receives from the ground to suppress vibrations of the chassis 12. In addition, a stabilizer configured to suppress tilting of a vehicle body during turning and other operations is provided at connecting portions of the right and left suspension arms. In order to improve the property of following irregularities of a road surface to transmit the driving force of the driving wheels to the road surface efficiently, the suspension device 12b is desirably an independent suspension type capable of independently moving the right and left wheels up and down.

The electric vehicle 11 need not comprise a motor, a drive shaft, a differential gear mechanism, and other components on the chassis 12 because the in-wheel motor drive devices 21 configured to drive the right and left rear wheels 14, respectively, are arranged inside the wheel housings 12a. Accordingly, the electric vehicle 11 has the advantages in that a large passenger compartment space can be provided and rotation of the right and left driving wheels can be controlled, respectively.

It is necessary to reduce the unsprung weight in order to improve the driving stability and the NVH characteristics of the electric vehicle 11. In addition, the in-wheel motor drive device 21 is required to be downsized to provide a larger passenger compartment space. To this end, the in-wheel motor drive device 21 according to this embodiment is utilized as illustrated in FIG. 1.

Figure 2:
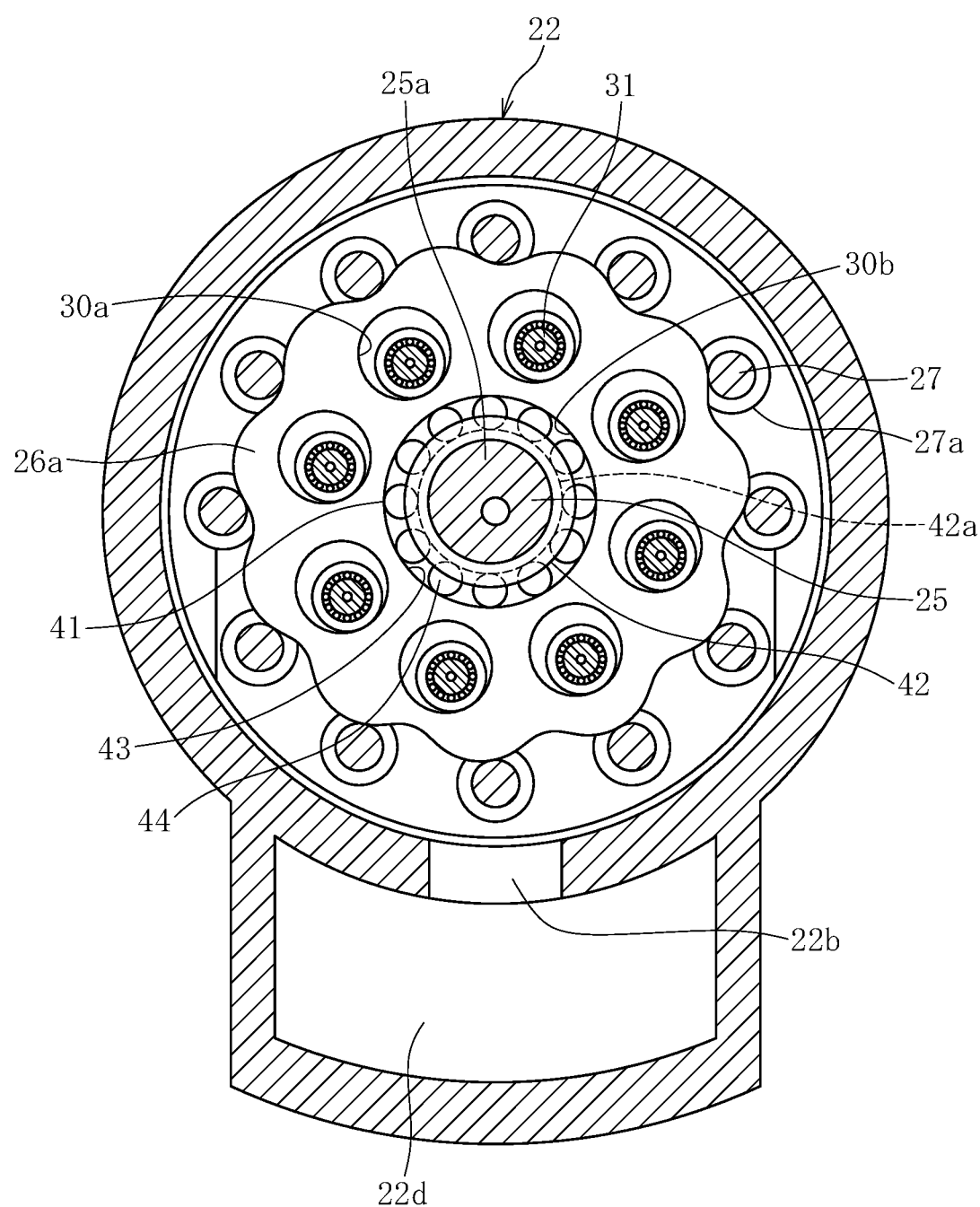
FIG. 2 is a transverse sectional view taken along the line O-O of FIG. 1.
Figure 3:
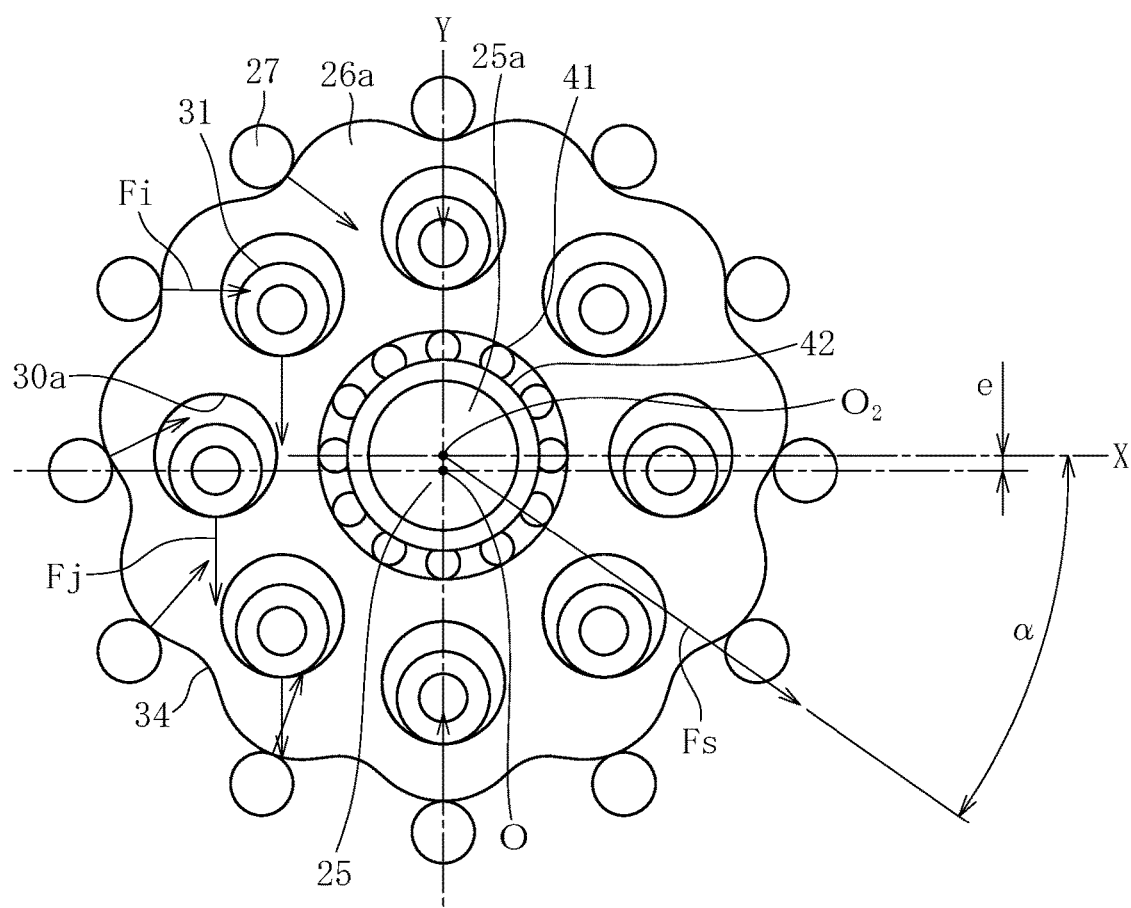
FIG. 3 is an explanatory view for illustrating a load acting on a curved plate of FIG. 1.
Figure 4:
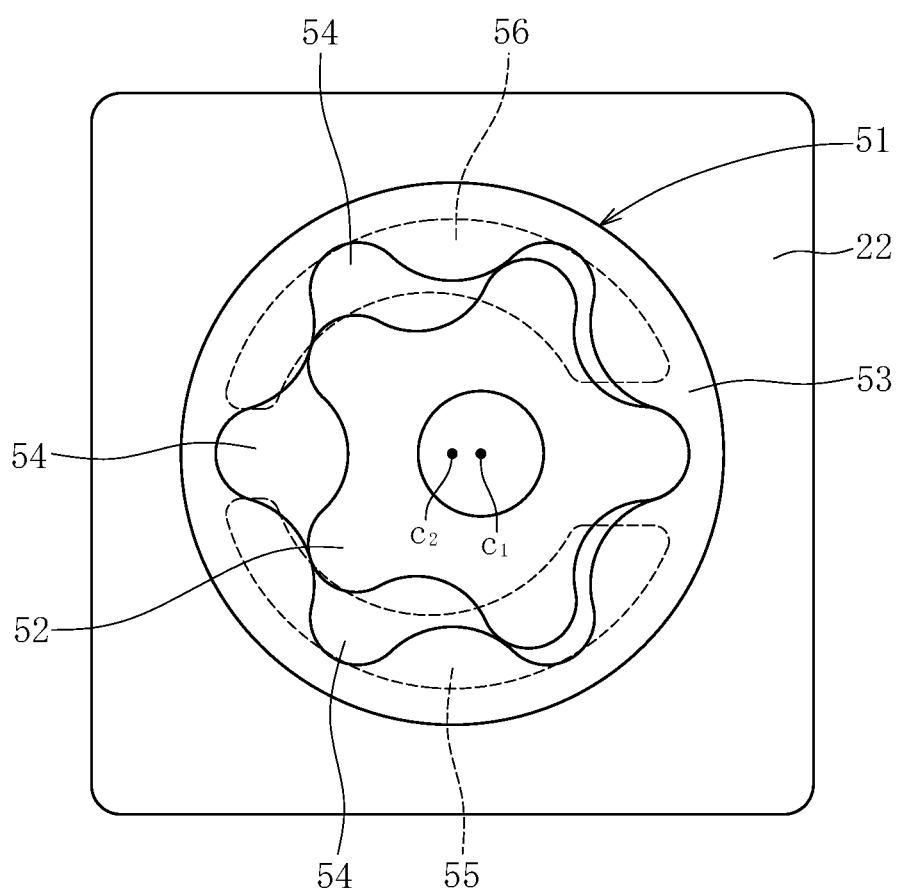
FIG. 4 is a transverse sectional view of a rotary pump of FIG. 1.
Figure 5:
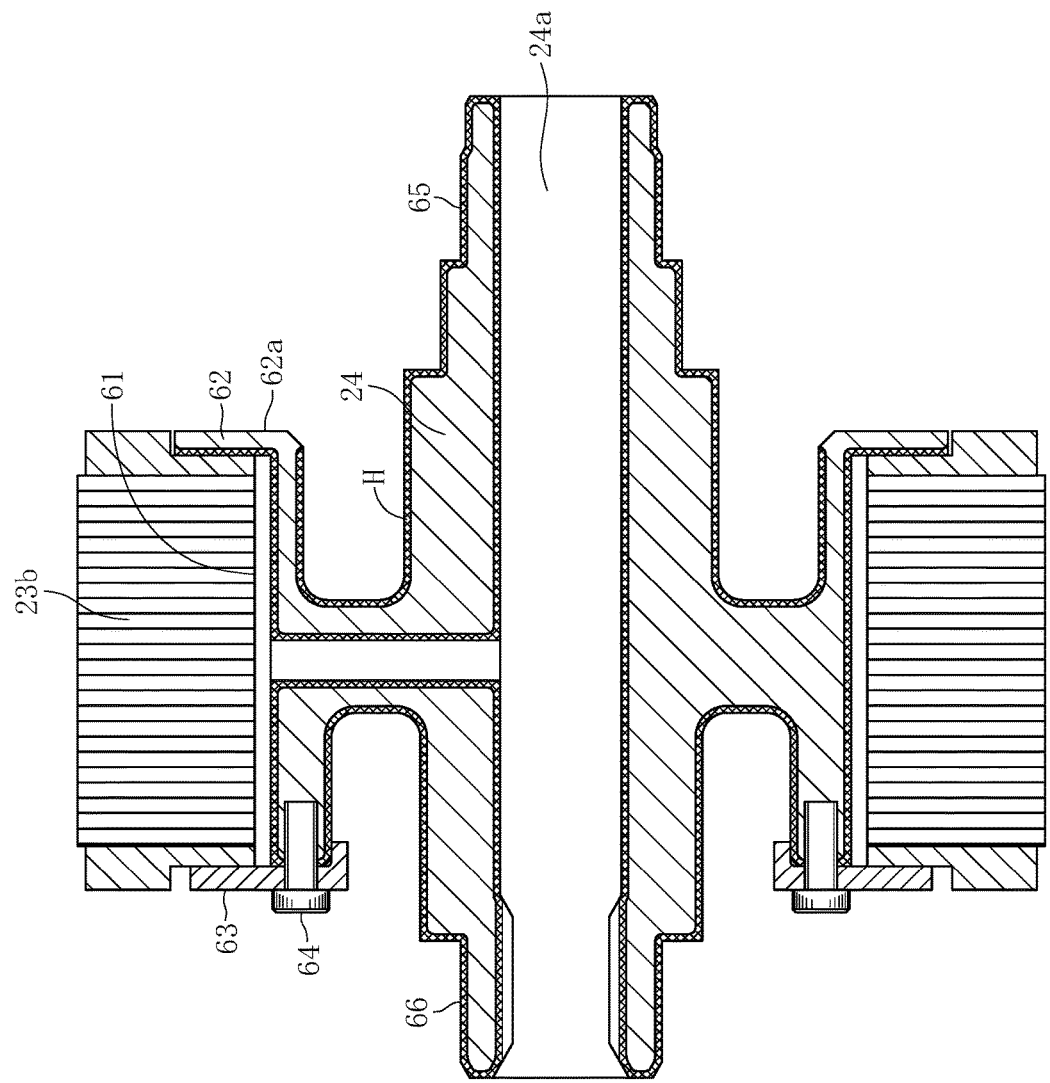
FIG. 5 is an enlarged longitudinal sectional view of a rotation shaft of a motor having a rotor of FIG. 1 mounted thereto.

The in-wheel motor drive device 21 according to the embodiment of the present invention is described with reference to FIG. 1 to FIG. 5. FIG. 1 is a schematic longitudinal sectional view of the in-wheel motor drive device 21. FIG. 2 is a transverse sectional view taken along the line O-O of FIG. 1. FIG. 3 is an explanatory view for illustrating a load acting on a curved plate. FIG. 4 is a transverse sectional view of a rotary pump. FIG. 5 is an enlarged longitudinal sectional view of a rotation shaft of a motor having a rotor mounted thereto. Prior to the description of a characteristic configuration of the in-wheel motor drive device according to this embodiment, an overall configuration of the in-wheel motor drive device is described.

Figure 1:
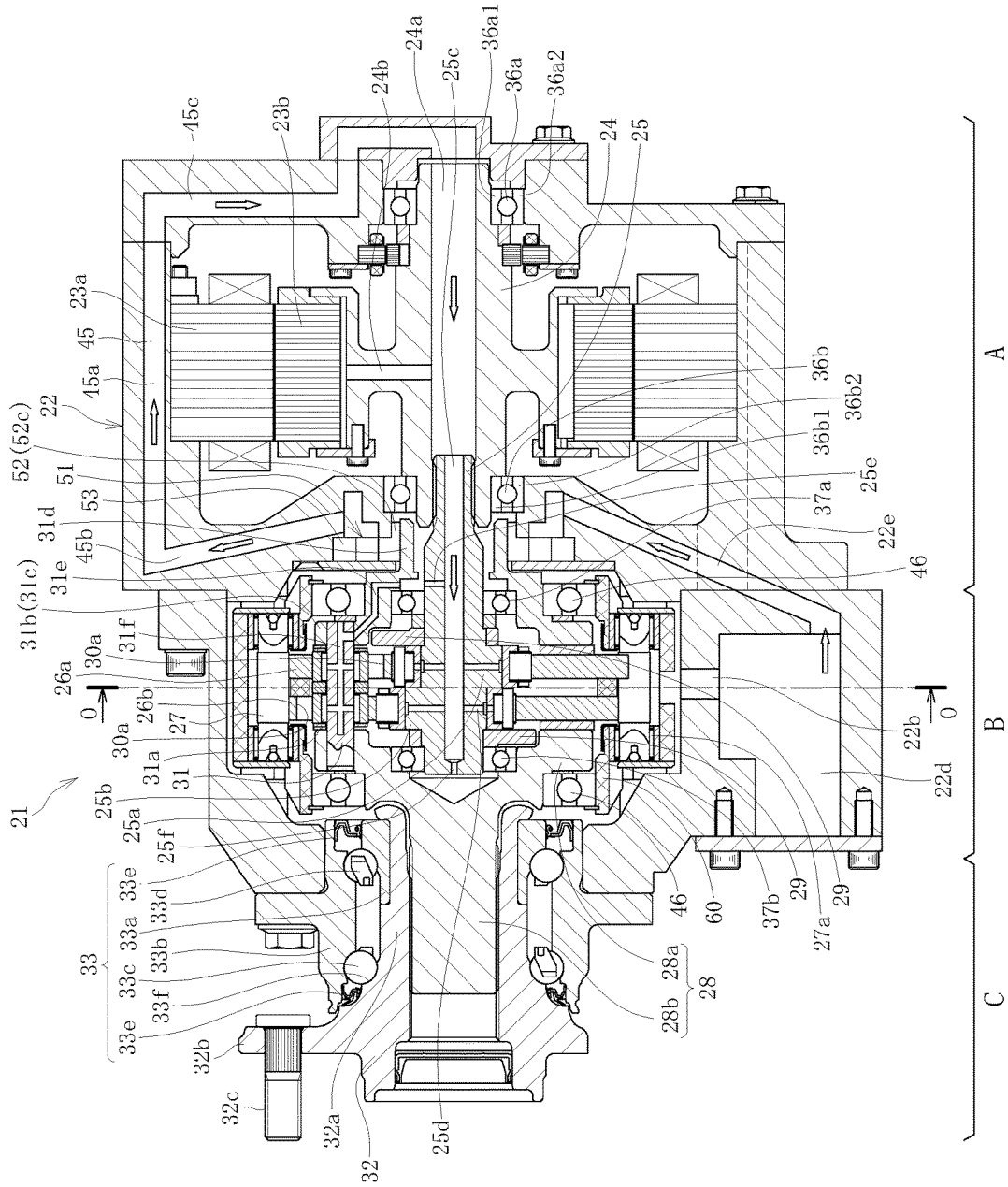
FIG. 1 is a view for illustrating an in-wheel motor drive device according to an embodiment of the present invention.

As illustrated in FIG. 1, the in-wheel motor drive device 21 comprises a motor part A configured to generate driving force, a speed reduction part B configured to reduce a speed of rotation of the motor part A to output the rotation, and a wheel bearing part C configured to transmit the output from the speed reduction part B to the driving wheel 14. The motor part A and the speed reduction part B are accommodated in a casing 22 and mounted inside the wheel housing 12a of the electric vehicle 11 as illustrated in FIG. 7. In this embodiment, the casing 22 is constructed such that the motor part A and the speed reduction part B are divisible from each other, and the motor part A and the speed reduction part B are fastened with bolts. In this description and the claims, the casing 22 refers to both of the casing portion accommodating the motor part A and the casing portion accommodating the speed reduction part B.

The motor part A is a radial gap motor comprising a stator 23a fixed to the casing 22, a rotor 23b arranged inside the stator 23a at an opposed position with a radial gap, and a rotation shaft 24 of the motor, which is connected and fixed to the inside of the rotor 23b so as to rotate integrally with the rotor 23b.

The rotation shaft 24 of the motor having the hollow structure is fitted and fixed to the radially inner surface of the rotor 23b to rotate integrally and is rotatably supported by a rolling bearing 36a at one end in its axial direction (right side in FIG. 1) and by a rolling bearing 36b at the other end in the axial direction (left side in FIG. 1) inside the motor part A.

An input shaft 25 of the speed reducer is rotatably supported by a rolling bearing 37a at one approximately central portion in its axial direction (right side in FIG. 1) and by a rolling bearing 37b at the other end in the axial direction (left side in FIG. 1) with respect to an output shaft 28 of the speed reducer. The input shaft 25 of the speed reducer has eccentric portions 25a and 25b inside the speed reduction part B. The two eccentric portions 25a and 25b are arranged with a 180° phase shift to mutually cancel out centrifugal force caused by eccentric motion.

The rotation shaft 24 of the motor and the input shaft 25 of the speed reducer are connected to each other by spline (including serration; the same applies hereinafter) fitting, and the driving force of the motor part A is transmitted to the speed reduction part B. The spline fitting portion is configured to suppress influences on the rotation shaft 24 of the motor even when the input shaft 25 of the speed reducer inclines to some extent.

The speed reduction part B comprises curved plates 26a and 26b serving as revolving members rotatably held at the eccentric portions 25a and 25b, a plurality of outer pins 27 serving as outer periphery engagement members configured to engage with outer peripheral portions of the curved plates 26a and 26b, a motion conversion mechanism configured to transmit rotational motion of the curved plates 26a and 26b to the output shaft 28 of the speed reducer, and a counterweight 29 arranged at a position adjacent to the eccentric portions 25a and 25b.

The output shaft 28 of the speed reducer has a flange portion 28a and a shaft portion 28b. At the end surface of the flange portion 28a, holes for fixing inner pins 31 are formed at equal intervals on the circumference about the rotation axis of the output shaft 28 of the speed reducer. The shaft portion 28b is connected to a hub wheel 32 serving as an inner member in the wheel bearing part C by spline fitting, to thereby transmit the output from the speed reduction part B to the wheel 14.

As illustrated in FIG. 2, the curved plate 26a has a plurality of wave patterns formed of trochoidal curves such as epitrochoidal curves in the outer periphery portion, and a plurality of through-holes 30a and a through-hole 30b each extending from one end surface to the other end surface. The plurality of through-holes 30a are formed at equal intervals on the circumference about the rotation axis of the curved plate 26a and are configured to receive the inner pins 31 to be described later. The through-hole 30b is formed at the center of the curved plate 26a, and the eccentric portion 25a is fitted thereinto.

The curved plate 26a is rotatably supported by a rolling bearing 41 with respect to the eccentric portion 25a. As illustrated in FIG. 2, the rolling bearing 41 is a cylindrical roller bearing comprising an inner ring 42 being fitted onto the radially outer surface of the eccentric portion 25a and having an inner raceway surface 42a on the radially outer surface, an outer raceway surface 43 directly formed at the radially inner surface of the through-hole 30b of the curved plate 26a, a plurality of cylindrical rollers 44 arranged between the inner raceway surface 42a and the outer raceway surface 43, and a cage (not shown) configured to retain the cylindrical rollers 44. The inner ring 42 has a flange portion projecting in a radially outward direction from both ends of the inner raceway surface 42a in the axial direction.

As illustrated in FIG. 2, the outer pins 27 are provided at equal intervals on the circumference about the rotation axis of the input shaft 25 of the speed reducer. As a result of revolving motion of the curved plates 26a and 26b, curved wave patterns are engaged with the outer pins 27 to cause rotational motion of the curved plates 26a and 26b. Each outer pin 27 is rotatably supported on an outer pin housing 60 by a needle roller bearing 27a (see FIG. 1). The resistance of contact with the curved plates 26a and 26b can be therefore reduced.

The counterweight 29 (see FIG. 1) has an approximately fan shape, has a through-hole into which the input shaft 25 of the speed reducer is fitted, and is arranged at a position adjacent to each of the eccentric portions 25a and 25b with a 180° phase shift with respect to the eccentric portions 25a and 25b in order to cancel out unbalanced inertia couple caused by the rotation of the curved plates 26a and 26b.

As illustrated in FIG. 1, the motion conversion mechanism comprises the plurality of inner pins 31 held on the output shaft 28 of the speed reducer and the through-holes 30a formed in the curved plates 26a and 26b. The inner pins 31 are provided at equal intervals on the circumference about the rotation axis of the output shaft 28 of the speed reducer (see FIG. 2), and each have one end in the axial direction fixed to the output shaft 28 of the speed reducer. In order to reduce the resistance of friction against the curved plates 26a and 26b, a needle roller bearing 31a is provided at a position of contact with the inner wall surfaces of the through-holes 30a in the curved plates 26a and 26b.

A stabilizer 31b is provided at the other ends of the inner pins 31 in the axial direction. The stabilizer 31b comprises an annular portion 31c having a circular ring shape and a cylindrical portion 31d extending axially from the radially inner surface of the annular portion 31c. The other ends of the plurality of inner pins 31 in the axial direction are fixed to the annular portion 31c. The load applied to some of the inner pins 31 from the curved plates 26a and 26b is supported by all the inner pins 31 through the stabilizer 31b. Therefore, the stress acting on the inner pins 31 can be reduced to improve the durability.

The through-holes 30a are formed at positions corresponding to the plurality of inner pins 31, and the inner diameter dimension of each through-hole 30a is set to be larger by a predetermined dimension than the outer diameter dimension (corresponding to "maximum outer diameter including the needle roller bearing 31a"; the same applies hereinafter) of each inner pin 31.

The state of the load acting on each of the curved plates 26a and 26b is described with reference to FIG. 3. An axial center $O_2$ of the eccentric portion 25a is eccentric with respect to an axial center O of the input shaft 25 of the speed reducer by an amount of eccentricity e. The curved plate 26a is mounted to the outer periphery of the eccentric portion 25a, and the eccentric portion 25a rotatably supports the curved plate 26a. Accordingly, the axial center $O_2$ is also an axial center of the curved plate 26a. The outer periphery of the curved plate 26a is formed of a wavy curve, and the curved plate 26a has radially concave and wavy recesses 34 equiangularly. On the periphery of the curved plate 26a, the plurality of outer pins 27 configured to engage with the recesses 34 are arranged in the circumferential direction about the axial center O.

In FIG. 3, when the eccentric portion 25a rotates in a counterclockwise direction on the drawing sheet together with the input shaft 25 of the speed reducer, the eccentric portion 25a revolves about the axial center O. Therefore, the recesses 34 of the curved plate 26a successively come into circumferential contact with the outer pins 27. As a result, as indicated by the arrows, the curved plate 26a is subjected to a load Fi from each of the plurality of outer pins 27 to rotate in a clockwise direction.

The curved plate 26a has the plurality of through-holes 30a formed in the circumferential direction about the axial center $O_2$. The inner pin 31 configured to be joined to the output shaft 28 of the speed reducer, which is arranged coaxially with the axial center O, is inserted through each through-hole 30a. The inner diameter of each through-hole 30a is larger by a predetermined dimension than the outer diameter of each inner pin 31, and hence the inner pins 31 do not impede the revolving motion of the curved plate 26a, and the inner pins 31 utilize the rotational motion of the curved plate 26a to rotate the output shaft 28 of the speed reducer. Then, the output shaft 28 of the speed reducer has a higher torque and a lower number of rotations than the input shaft 25 of the speed reducer, and the curved plate 26a is subjected to a load Fj from each of the plurality of inner pins 31, as indicated by the arrows in FIG. 3. A resultant force Fs of the plurality of loads Fi and Fj is applied to the input shaft 25 of the speed reducer.

The direction of the resultant force Fs varies depending on the geometric conditions such as the wavy shape of the curved plate 26a and the number of the recesses 34, and on the effect of centrifugal force. Specifically, an angle α formed between the resultant force Fs and a reference line X that is orthogonal to a straight line Y connecting the rotation axial center $O_2$ and the axial center O and passes through the axial center $O_2$ varies within a range of from approximately 30° to approximately 60°.

The above-mentioned plurality of loads Fi and Fj vary in load direction and load magnitude during one rotation (360°) of the input shaft 25 of the speed reducer. As a result, the resultant force Fs acting on the input shaft 25 of the speed reducer also varies in load direction and load magnitude. One rotation of the input shaft 25 of the speed reducer causes speed reduction of the wavy recesses 34 of the curved plate 26a to rotate the curved plate 26a by one pitch in the clockwise direction to be brought into the state of FIG. 3. This process is repeated.

As illustrated in FIG. 1, a wheel bearing 33 in the wheel bearing part C is a double-row angular contact ball bearing comprising an inner member formed of an inner raceway surface 33f directly formed at the radially outer surface of the hub wheel 32 and an inner ring 33a fitted onto a small-diameter step portion at the radially outer surface, an outer ring 33b fitted and fixed to the radially inner surface of the casing 22, a plurality of balls 33c serving as rolling elements arranged between the inner raceway surface 33f, the inner ring 33a, and the outer ring 33b, a cage 33d configured to keep the interval between the adjacent balls 33c, and a sealing member 33e configured to seal both ends of the wheel bearing 33 in the axial direction.

Next, a lubrication mechanism is described. The lubrication mechanism is configured to supply lubricating oil for cooling the motor part A, and also supply the lubricating oil to the speed reduction part B. The lubrication mechanism mainly comprises lubricating oil paths 24a and 25c, lubricating oil supply ports 24b, 25d, 25e, and 25f, a lubricating oil discharge port 22b, a lubricating oil reservoir 22d, a lubricating oil path 22e, a rotary pump 51, and a circulation oil path 45 as illustrated in FIG. 1. The outline arrows in the lubrication mechanism indicate directions of lubricating oil flow.

The lubricating oil path 25c, which is connected to the lubricating oil path 24a of the rotation shaft 24 of the motor, extends along the axial direction inside the input shaft 25 of the speed reducer. The lubricating oil supply ports 25d and 25e extend from the lubricating oil path 25c toward the radially outer surface of the input shaft 25 of the speed reducer, and the lubricating oil supply port 25f extends from an axial end of the input shaft 25 of the speed reducer in a rotation axis direction toward an axial end surface.

The lubricating oil discharge port 22b configured to discharge the lubricating oil inside the speed reduction part B is formed at least at one location of the casing 22 at the position of the speed reduction part B. Further, the lubricating oil reservoir 22d configured to temporarily store the discharged lubricating oil is formed.

As illustrated in FIG. 1, the circulation oil path 45 comprises an axial oil path 45a axially extending inside the casing 22, a radial oil path 45c being connected to one end of the axial oil path 45a in the axial direction (right side in FIG. 1) and extending in the radial direction, and a radial oil path 45b being connected to the other end of the axial oil path 45a in the axial direction (left side in FIG. 1) and extending in the radial direction.

To circulate the lubricating oil forcibly, the rotary pump 51 is provided between the circulation oil path 45 and the lubricating oil path 22e connected to the lubricating oil reservoir 22d. The radial oil path 45b supplies lubricating oil force-fed through the rotary pump 51 to the axial oil path 45a and supplies the lubricating oil from the axial oil path 45a to each of the lubricating oil paths 24a and 25c through the radial oil path 45c.

As illustrated in FIG. 4, the rotary pump 51 is a cycloid pump comprising an inner rotor 52 configured to rotate using the rotation of the output shaft 28 of the speed reducer, an outer rotor 53 configured to be driven to rotate in conjunction with the rotation of the inner rotor 52, pump chambers 54, a suction port 55 communicating with the lubricating oil path 22e, and a discharge port 56 communicating with the radial oil path 45b of the circulation oil path 45. Increase in size of the overall in-wheel motor drive device 21 can be prevented by arranging the rotary pump 51 inside the casing 22.

The inner rotor 52 rotates about a rotation center $c_1$, whereas the outer rotor 53 rotates about a rotation center $c_2$. The inner rotor 52 and the outer rotor 53 rotate about the different rotation centers $c_1$ and $c_2$, and hence the volume of each pump chamber 54 changes continuously. Thus, the lubricating oil entering through the suction port 55 is force-fed through the discharge port 56 to the radial oil path 45b.

The motor part A is cooled as follows. As illustrated in FIG. 1, a part of the lubricating oil returned to the lubricating oil path 24a through the circulation oil path 45 flows through the lubricating oil supply port 24b under centrifugal force to cool the rotor 23b. After that, the lubricating oil splashes to cool the stator 23a.

The speed reduction part B is lubricated as follows. The lubricating oil in the lubricating oil path 25c flows out through the lubricating oil supply ports 25d and 25e to enter the speed reduction part B under centrifugal force and pressure caused along with the rotation of the input shaft 25 of the speed reducer. The lubricating oil flowing out through the lubricating oil supply port 25d lubricates the cylindrical roller bearing 41 supporting each of the curved plates 26a and 26b, and moves radially outward under centrifugal force while lubricating, for example, portions of contact between each of the curved plates 26a and 26b and the inner pins 31, and portions of contact between each of the curved plates 26a and 26b and the outer pins 27. The lubricating oil flowing out through the lubricating oil supply ports 25e and 25f is supplied to the deep groove ball bearings 37a and 37b supporting the input shaft 25 of the speed reducer, and further to the internal bearings and the contact portions.

The lubricating oil having reached the inner wall surface of the casing 22 is discharged through the lubricating oil discharge port 22b to be stored in the lubricating oil reservoir 22d. The lubricating oil reservoir 22d is provided between the lubricating oil discharge port 22b and the rotary pump 51. Therefore, even when a part of the lubricating oil cannot temporarily be discharged by the rotary pump 51, the lubricating oil can be stored in the lubricating oil reservoir 22d. As a result, increase in torque loss of the speed reduction part B can be prevented. On the other hand, even when the amount of lubricating oil having reached the lubricating oil discharge port 22b is reduced, the lubricating oil stored in the lubricating oil reservoir 22d can be returned to the lubricating oil paths 24a and 25c by the rotary pump 51. The lubricating oil moves under the gravity in addition to the centrifugal force. Therefore, the lubricating oil reservoir 22d is desirably mounted to the electric vehicle 11 so as to be located below the in-wheel motor drive device 21.

The overall configuration of the in-wheel motor drive device 21 according to this embodiment is as described above. A characteristic configuration of the in-wheel motor drive device 21 is described below.

As illustrated in FIG. 1, in the motor part A, the stator 23a is fixed to the casing 22, and the rotor 23b is arranged inside the stator 23a at an opposed position with a radial gap. The rotor 23b is fitted and fixed to the outside of the rotation shaft 24 of the motor to rotate integrally with the rotation shaft 24 of the motor.

The rotation shaft 24 of the motor is rotatably supported by the deep groove ball bearing 36a being the rolling bearing at one end in the axial direction (right side in FIG. 1) and by the deep groove ball bearing 36b being the rolling bearing at the other end in the axial direction (left side in FIG. 1) inside the casing 22.

As described above, the rotation shaft 24 of the motor rotates at a high speed of about 15,000 min$^{-1}$. From the viewpoint of suppressing vibrations, inner rings 36a1 and 36b1 of the deep groove ball bearings 36a and 36b and the rotation shaft 24 of the motor are fitted to each other by transition fit or interference fit, whereas outer rings 36a2 and 36b2 of the deep groove ball bearings 36a and 36b and the casing 22 are fitted to each other by clearance fit. A preload is applied to each of the deep groove ball bearings 36a and 36b in the axial direction.

FIG. 5 is an enlarged longitudinal sectional view of the rotation shaft of the motor and the rotor. The rotation shaft 24 of the motor is made of case hardening steel such as SCM415 or SCM420, and is subjected to carburizing, quenching, and tempering. A heat-treated hardened layer H is indicated by cross hatching. The surface of the rotation shaft 24 of the motor, which is subjected to carburizing, quenching, and tempering, has a high hardness of from 62 HRC to 66.5 HRC. On the other hand, the central portion has a hardness of from about 29 HRC to about 38 HRC.

A large-diameter radially outer portion 61 of the rotation shaft 24 of the motor is a portion to which the rotor 23b is fitted. A flange portion 62 configured to hold the rotor 23b in the axial direction is formed at one end of the large-diameter radially outer portion 61. An outer surface 62a of the flange portion 62 is subjected to anti-carburizing treatment, and has a hardness of from about 29 HRC to about 38 HRC. The large-diameter radially outer portion 61 of the rotation shaft 24 of the motor and a radially inner portion of the rotor 23b are fitted to each other by interference fit or shrink fit with an interference selected in consideration of expansion caused by centrifugal force and thermal expansion. In the case of interference fit, the large-diameter radially outer portion 61 of the rotation shaft 24 of the motor and the radially inner portion of the rotor 23b are press-fitted in contact with each other. The large-diameter radially outer portion 61 is formed to have high surface hardness, thereby being capable of preventing abrasion of the contact portion.

After the rotor 23b is press-fitted until the rotor 23b is brought into contact with the flange portion 62 of the large-diameter radially outer portion 61, a separate clamping member 63 is brought into abutment against the other end of the rotor 23b to be fixed by fastening with a bolt 64. In this manner, the rotor 23b is mounted to the rotation shaft 24 of the motor. For the clamping member 63, there is selected a material having high specific gravity, and also having non-magnetic property so that shavings to be generated by cutting work for adjustment of unbalance described later are not attracted to the rotor 23b. As the material for the clamping member 63, austenitic stainless steel is desired. As the material for the clamping member 63, aluminum is not preferred because the specific gravity is low. As the material having high specific gravity and non-magnetic property, tungsten and copper may be used, but the cost is increased.

Heat-treated hardened layers are also formed on bearing mounting surfaces 65 and 66 at both ends of the rotation shaft 24 of the motor in the axial direction. The inner rings 36a1 and 36b1 of the deep groove ball bearings 36a and 36b and the bearing mounting surfaces 65 and 66 of the rotation shaft 24 of the motor are fitted to each other by transition fit or interference fit, respectively. Due to the heat-treated hardened layers formed on the bearing mounting surfaces 65 and 66, the inner rings 36a1 and 36b1 do not damage the bearing mounting surfaces 65 and 66 at the time of assembling, respectively.

The central portion of the rotation shaft 24 of the motor has toughness, thereby being durable against deformation during high-speed rotation. Therefore, the in-wheel motor drive device is suitable as an in-wheel motor drive device in which a low-torque high-rotation motor and a cycloid reducer capable of obtaining a high speed reduction ratio are used in combination.

After the assembling of the rotor 23b onto the rotation shaft 24 of the motor is completed, the adjustment of unbalance is performed for the purpose of reducing a rotational first-order forced vibration component. The outer surface 62a of the flange portion 62 of the large-diameter radially outer portion 61 and the outer surface of the clamping member 63 are surfaces for correction of balance. The outer surface 62a of the flange portion 62 and the outer surface of the clamping member 63 are set as the surfaces for correction of balance because the surfaces are preferably formed as nearly on the radially outer side as possible in order to reduce the cutting amount for the adjustment of unbalance. The present invention is not limited thereto, and any one of the outer surface 62a of the flange portion 62 and the outer surface of the clamping member 63 may be set as the surface for correction of balance. The outer surface 62a of the flange portion 62 is subjected to anti-carburizing treatment to have low hardness, thereby being capable of achieving satisfactory cutting work for the adjustment of unbalance, reducing the cycle time of the cutting step, facilitating the adjustment of unbalance, and reducing the cost. The clamping member 63 has high specific gravity, thereby being capable of reducing the processing amount, reducing the cycle time of the cutting step, facilitating the adjustment of unbalance, and reducing the cost.

The anti-carburizing treatment for the flange portion 62 may be implemented by any appropriate methods such as a method that involves applying an anti-carburizing agent onto the outer surface 62a and a method that involves carburizing while bringing a jig into surface contact with the outer surface 62a. The carburizing and quenching are flexible in response to minor changes to the shape and also simple to discriminate the heat treatment portion and the non-heat treatment portion of the rotation shaft 24 of the motor, thereby being advantageous in terms of cost.

It is preferred that the rotation shaft 24 of the motor having the rotor 23b mounted thereto have a permissible residual specific unbalance within a range of from 0.5 to 5 after the adjustment of unbalance. The permissible residual specific unbalance refers to, in conformity with JIS B 0905, an amount obtained by dividing a permissible residual unbalance, which corresponds to the magnitude of the maximum permissible residual unbalance, by the mass of the rotor.

The permissible residual specific unbalance within the range of from 0.5 to 5 corresponds to a balance quality grade of from G1 to G6.3 as specified in JIS. G1 Class is required for grinding-wheel spindles, G2.5 Class is required for machine-tool spindles, gas turbines, and jet turbine-driven pumps, and G6.3 Class is required for pumps and fans of general industrial machinery, and general pneumatic and hydraulic machinery. In this embodiment, the permissible residual specific unbalance is set within the range of from 0.5 to 5, thereby being capable of suppressing interior vibrations, achieving excellent quietness, and preventing passengers' feelings of discomfort.

The other end of the rotation shaft 24 of the motor in the axial direction (left side in FIG. 1) is connected to the input shaft 25 of the speed reducer by spline fitting. The spline fitting portion is affected by the operation of the speed reduction part B. The outer pin housing 60 configured to hold the outer pins 27 of the speed reduction part B as illustrated in FIG. 1 is supported on the casing 22 in a floating state by a rotation stopper (not shown) having an elastic support function. With this configuration, significant radial and moment loads, which may be generated due to, for example, turning or abrupt acceleration and deceleration of the vehicle, are absorbed to prevent damage to various components such as the curved plates 26a and 26b, the outer pins 27, and the motion conversion mechanism configured to convert eccentric pivot motion of each of the curved plates 26a and 26b into rotary motion of the output shaft 28 of the speed reducer.

Under the state of the above-mentioned floating structure, the radial and moment loads, which vary in load direction and load magnitude, are applied to the input shaft 25 of the speed reducer from each of the curved plates 26a and 26b as described above. Therefore, the torque is transmitted at the spline fitting portion between the rotation shaft 24 of the motor and the input shaft 25 of the speed reducer under a state in which inclination or axial misalignment is caused to some extent. The rotation shaft 24 of the motor is made of case hardening steel and subjected to carburizing, quenching, and tempering as heat treatment. Thus, the rotation shaft 24 of the motor has sufficient abrasion resistance, thereby being capable of enhancing the durability.

The in-wheel motor drive device 21 according to this embodiment comprises the rotation shaft 24 of the motor, which has excellent processability and abrasion resistance at the fitting portion, has required surface hardness and toughness, facilitates the adjustment of unbalance, and has an advantage in terms of cost. Thus, the in-wheel motor drive device 21 according to this embodiment can be reduced in size and weight, excellent in quietness, and enhanced in durability.

The overall operation principle of the in-wheel motor drive device 21 having the above-mentioned configuration is described.

Description is made with reference to FIG. 1 and FIG. 2. In the motor section A, for example, coils in the stator 23a are supplied with AC current to generate an electromagnetic force, which in turn rotates the rotor 23b formed of a permanent magnet or a magnetic member. The input shaft 25 of the speed reducer, which is connected to the rotation shaft 24 of the motor, is therefore rotated to cause the curved plates 26a and 26b to revolve about the rotation axis of the input shaft 25 of the speed reducer. Then, the outer pins 27 come into engagement with the curved wave patterns of the curved plates 26a and 26b to rotate the curved plates 26a and 26b on their axes in an opposite direction to the rotation of the input shaft 25 of the speed reducer.

The inner pins 31 inserted through the through-holes 30a come into contact with the inner wall surfaces of the through-holes 30a in conjunction with the rotational motion of the curved plates 26a and 26b. The revolving motion of the curved plates 26a and 26b is therefore prevented from being transmitted to the inner pins 31, and only the rotational motion of the curved plates 26a and 26b is transmitted to the wheel bearing part C through the output shaft 28 of the speed reducer.

In this process, the speed of the rotation of the input shaft 25 of the speed reducer is reduced by the speed reduction part B and the rotation is transmitted to the output shaft 28 of the speed reducer. Therefore, a necessary torque can be transmitted to the driving wheel 14 even in a case where the motor part A of a low-torque high-rotation type is employed.

When the number of the outer pins 27 and the number of wave patterns of the curved plates 26a and 26b are denoted by $Z_A$ and $Z_B$, respectively, the speed reduction ratio in the speed reduction part B having the above-mentioned configuration is calculated by $(Z_A-Z_B)/Z_B$. In the embodiment illustrated in FIG. 2, $Z_A=12$ and $Z_B=11$. Thus, a very high speed reduction ratio of 1/11 can be obtained.

The in-wheel motor drive device 21 that is compact and has a high speed reduction ratio can be obtained by using the speed reduction part B capable of obtaining a high speed reduction ratio without requiring a multi-stage configuration. Moreover, the needle roller bearings 27a and 31a are provided to the outer pins 27 and the inner pins 31, respectively, to reduce the frictional resistance between those pins and the curved plates 26a and 26b, thereby improving the transmission efficiency of the speed reduction part B.

The unsprung weight can be reduced by mounting the in-wheel motor drive device 21 according to this embodiment on the electric vehicle 11. As a result, the electric vehicle 11 having excellent driving stability and NVH characteristics can be obtained.

In this embodiment, there has been given an example in which the lubricating oil supply port 24b is formed in the rotation shaft 24 of the motor, the lubricating oil supply port 25e is formed in the vicinity of the rolling bearing 37a, the lubricating oil supply port 25d is formed in each of the eccentric portions 25a and 25b, and the lubricating oil supply port 25f is formed in the axial end of the input shaft 25 of the speed reducer. The present invention is not limited thereto, and the lubricating oil supply ports may be formed at any positions in the rotation shaft 24 of the motor and the input shaft 25 of the speed reducer.

There has been given an example in which a cycloid pump is used as the rotary pump 51, but the present invention is not limited thereto. Any rotary pump that is driven using the rotation of the output shaft 28 of the speed reducer may be employed. Further, the rotary pump 51 may be omitted so that the lubricating oil is circulated only by centrifugal force.

There has been given an example in which the two curved plates 26a and 26b of the speed reduction part B are arranged with a 180° phase shift. However, the number of curved plates may be arbitrarily set and in a case where three curved plates are arranged, for example, the three curved plates may be arranged with a 120° phase shift.

There has been given an example in which the motion conversion mechanism comprises the inner pins 31 fixed to the output shaft 28 of the speed reducer and the through-holes 30a formed in the curved plates 26a and 26b. However, the present invention is not limited thereto. Any configuration may be applied as long as the rotation of the speed reduction part B can be transmitted to the hub wheel 32. For example, the motion conversion mechanism may comprise inner pins fixed to the curved plates and holes formed in the output shaft of the speed reducer.

Attention has been focused on the rotation of each member to describe the operation in this embodiment. In fact, however, power containing a torque is transmitted from the motor part A to the driving wheel 14. Accordingly, the power after speed reduction as described above is converted into a high torque.

There has been given a case where electric power is supplied to the motor part A to drive the motor part and the power from the motor part A is transmitted to the driving wheel 14. Contrary to this, however, when a vehicle decelerates or travels down a slope, power from the driving wheel 14 side may be converted at the speed reduction part B into high-rotation low-torque rotation so that the rotation is transmitted to the motor part A for electric power generation in the motor part A. Further, the electric power generated in the motor part A may be stored in a battery so that the electric power is used to drive the motor part A later or to operate other electric devices provided in the vehicle.

A brake may also be added to the configuration in this embodiment. For example, in the configuration of FIG. 1, the casing 22 may be extended in its axial direction to form a space on the right side of the rotor 23b in FIG. 1, and a rotary member configured to rotate integrally with the rotor 23b, a piston non-rotatable with respect to the casing 22 and movable in its axial direction, and a cylinder configured to operate the piston may be arranged, thereby constructing a parking brake in which the rotor 23b is locked by the piston and the rotary member while a vehicle is stopped.

There may also be employed a disc brake in which a flange formed at a part of a rotary member configured to rotate integrally with the rotor 23b and a friction plate arranged on the casing 22 side are sandwiched using a cylinder arranged on the casing 22 side. There may also be employed a drum brake in which a drum is formed at a part of a rotary member and a brake shoe is fixed on the casing 22 side so that the rotary member is locked by the actions of frictional engagement and self-engagement.

In this embodiment, there has been given an example in which a radial gap motor is employed in the motor part A. However, the present invention is not limited thereto, and a motor having arbitrary configuration is applicable. For example, there may be used an axial gap motor comprising a stator to be fixed to a casing, and a rotor arranged on the inner side of the stator at an opposed position with an axial gap.

In addition, there has been given an example in which the rear wheels 14 of the electric vehicle 11 illustrated in FIG. 6 serve as driving wheels. However, the present invention is not limited thereto, and the front wheels 13 may be used as driving wheels or a four-wheel drive vehicle may be used. It should be understood that "electric vehicle" as used herein is a concept encompassing all vehicles that may obtain driving force from electric power and also encompasses, for example, a hybrid car.

The present invention is not limited to the above-mentioned embodiment. As a matter of course, the present invention may be carried out in various modes without departing from the gist of the present invention. The scope of the present invention is defined in claims, and encompasses equivalents described in claims and all changes within the scope of claims.

DESCRIPTION OF REFERENCE SIGNS 11 electric vehicle, 12 chassis, 12a wheel housing, 12b suspension device, 13 front wheel, 14 rear wheel, 21 in-wheel motor drive device, 22 casing, 22b lubricating oil discharge port, 22d lubricating oil reservoir, 22e lubricating oil path, 23a stator, 23b rotor, 24 rotation shaft of motor, 25 input shaft of speed reducer, 25a eccentric portion, 25b eccentric portion, 25c lubricating oil path, 25d lubricating oil supply port, 25e lubricating oil supply port, 26a curved plate, 26b curved plate, 27 outer pin, 27a needle roller bearing, 28 output shaft of speed reducer, 29 counterweight, 30b through-hole, 31 inner pin, 31a needle roller bearing, 31b stabilizer, 31c annular portion, 31d cylindrical portion, 32 hub wheel, 33 wheel bearing, 33a inner ring, 33b outer ring, 33c ball, 33d cage, 33e sealing member, 33f inner raceway surface, 36a rolling bearing, 36b rolling bearing, 37a rolling bearing, 37b rolling bearing, 41 rolling bearing, 42 inner ring, 43 outer raceway surface, 44 cylindrical roller, 45 circulation oil path, 45a axial oil path, 45b radial oil path, 45c radial oil path, 51 rotary pump, 52 inner rotor, 53 outer rotor, 54 pump chamber, 55 suction port, 56 discharge port, 60 outer pin housing, 61 large-diameter radially outer portion, 62 flange portion, 62a outer surface, 63 clamping member, 65 bearing mounting surface, 66 bearing mounting surface, H heat-treated hardened layer

The invention claimed is:

1. An in-wheel motor drive device, comprising:
a motor part;
a speed reduction part;
a wheel bearing part; and
a casing, wherein
the motor part comprises:
    a stator, which is fixed to the casing;
    a rotation shaft of a motor, which is rotatably supported on the casing through intermediation of a plurality of rolling bearings; and
    a rotor, which is mounted to the rotation shaft of the motor,
the rotation shaft of the motor in the motor part is configured to rotationally drive an input shaft of a speed reducer in the speed reduction part,
the speed reduction part is configured to reduce a speed of rotation of the input shaft of the speed reducer to transmit the rotation to an output shaft of the speed reducer,
the wheel bearing part is connected to the output shaft of the speed reducer,
the rotation shaft of the motor is made of case hardening steel and subjected to carburizing, quenching, and tempering as heat treatment, and
the rotation shaft of the motor comprises:
    a large-diameter radially outer portion integrally formed on the rotation shaft of the motor;
    a flange portion formed on the large-diameter radially outer portion, and configured to hold one end of the rotor in an axial direction of the rotor; and
    a clamping member to be brought into contact with another end of the rotor,
    wherein the rotor is clamped by the flange portion and the clamping member to be mounted to the rotation shaft of the motor, and the flange portion comprises a low-hardness portion for adjustment of unbalance.

2. The in-wheel motor drive device according to claim 1, wherein the low-hardness portion is subjected to anti-carburizing treatment.

3. The in-wheel motor drive device according to claim 1, wherein the clamping member is made of a material different from a material for the rotation shaft of the motor.

4. The in-wheel motor drive device according to claim 3, wherein the clamping member is made of austenitic stainless steel.

* * * * *